(12) United States Patent
Biragnet et al.

(10) Patent No.: US 6,723,139 B1
(45) Date of Patent: Apr. 20, 2004

(54) METHOD FOR RECYCLING FINE CALCIUM FLUORIDE POWDER

(75) Inventors: Jean-Marc Biragnet, Lyons (FR); John-David Murphy, Mereyside (GB); Henri Kouache, Corbap (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/868,993

(22) PCT Filed: Dec. 2, 1999

(86) PCT No.: PCT/FR99/02989

§ 371 (c)(1),
(2), (4) Date: Oct. 25, 2001

(87) PCT Pub. No.: WO00/40510

PCT Pub. Date: Jul. 13, 2000

(30) Foreign Application Priority Data

Dec. 30, 1998 (FR) ............................................. 98 16625

(51) Int. Cl.⁷ ................................................. C01F 11/22
(52) U.S. Cl. ......................... 23/304; 423/490; 423/497
(58) Field of Search ............................. 23/295 R, 300, 23/304; 423/490, 497

(56) References Cited

FOREIGN PATENT DOCUMENTS

| DE | 155979 | 7/1982 |
| EP | 0 460 524 | 12/1991 |
| JP | 52-10893 | 1/1977 |
| JP | 52-17390 | 2/1977 |

OTHER PUBLICATIONS

Patent Abstracts of Japan, vol. 001, No. 053 (C–013), May 23, 1977.
Chemical Abstracts, vol. 86, No. 22, 1977, no month.
Database WPI Section Ch, Week 7712, Derwent Publications Ltd., London, GB, no date.
English language translation of Preliminary Examination Report (PCT/IPEA/416) and (PCT/IPEA/409), no date.
Patent Abstracts of Japan (Japanese application JP 52–10893 submitted in prior IDS), no date.
XP–002114312—(Japanese application JP 52–17390 submitted in prior IDS), no date.

*Primary Examiner*—Stanley S. Silverman
*Assistant Examiner*—Edward M. Johnson

(57) ABSTRACT

Process for recycling a composition comprising pulverulent calcium fluoride in the form of micrometric particles comprising:
(i) a stage of mixing, in the presence of water, the said composition with pulverulent calcium fluoride (also known as natural spar), the particle size of which is suitable for feeding an HF furnace, in a ratio r of less than 75% by weight, preferably of less than 30%, then
(ii) a stage of drying the mixture resulting from (i) until a residual water content is obtained which is also suitable for feeding an HF furnace;
the stage (ii) optionally being carried out simultaneously with the stage (i).

19 Claims, No Drawings

METHOD FOR RECYCLING FINE CALCIUM FLUORIDE POWDER

FIELD OF THE INVENTION

The subject-matter of the present invention is a process for recycling pulverulent calcium fluoride in the form of micrometric particles. It also relates to a process for manufacturing hydrogen fluoride employing the said process.

BACKGROUND OF THE INVENTION compositions comprising fluoride ions are often obtained as manufacturing waste in various industrial plants, such as plants for the production of hydrofluoric acid (HF) or compounds of the chlorofluorocarbon, hydrochlorofluorocarbon or hydrofluorocarbon type, which can be used in particular as refrigerants.

These compositions are generally neutralized with lime or with calcium carbonate. The precipitate formed is separated by flocculation, then settling of the suspensions which result from the neutralization, and finally filtration by appropriate means, such as drum filters. These compositions exist in practice in the form of sludges or cakes and are distinguished, on the one hand, in that the calcium fluoride is present in the form of extremely fine micrometric particles of the order of 0.5 to 10 μm and, on the other hand, in that they comprise a very high water content, approximately from 20 to 60%, depending on the filtration method used.

Given the size of the amounts of HF or of compounds usable in particular as refrigerants produced in an industrial plant, the abovementioned compositions are themselves produced at the rate of several thousand tonnes per year and are generally stored in landfill sites.

Now, calcium fluoride, also known as fluorospar (from the name of the ore in which it is present), is precisely one of the starting materials of the industrial process widely used for the manufacture of hydrogen fluoride (HF).

This is because this process employs fluorospar and sulphuric acid to produce HF and calcium sulphate according to the reaction:

$$CaF_2 + H_2SO_4 \rightarrow 2HF + CaSO_4 \quad (1).$$

In this process, the fluorospar is brought into contact, in solid pulverulent form, with sulphuric acid in a rotary furnace at a temperature of approximately 500° C.

A rotary furnace is a horizontal cylinder driven with a rotational movement about its axis. The reactants are introduced at one end of this cylinder, the HF produced in the gaseous form being collected at this same end. The calcium sulphate is recovered at the other end in the form of a solid which is also pulverulent. The reaction must take place in the absence of water in order to avoid corrosion of the furnace.

It would therefore be highly desirable to use compositions based on micrometric $CaF_2$ particles, such as those mentioned above, as starting material for the production of HF. However, such a use raises difficulties in carrying out the reaction (1) in a rotary furnace which are related to the particle size of the said compositions and to the drying of the said compositions to the level required for the said use.

Patent Application EP 460,524 discloses a process for the manufacture of HF employing the reaction (1) which comprises a stage of purification of the gas produced by the reaction, on conclusion of which an aqueous solution is obtained comprising from 30 to 50% of fluorosilic acid ($H_2SiF_6$) and 5 to 20% of HF. The treatment with lime of such a solution results in a mixture of calcium fluoride ($CaF_2$) and of silica ($SiO_2$) which is unsuitable for any use and must be stored as waste. This document teaches a treatment of this solution with calcium carbonate and then with an alkaline substance which makes it possible to separate the calcium chloride from the silica. This document consequently recommends the use of the calcium fluoride thus separated as starting material for the manufacture of HF. It also envisages, for this same use and with the aim of reducing the content of silica still present in the form of an impurity, the mixture of the said fluoride with fluorospar. However, it gives no detailed information on the effective use of such a product under the industrial operating conditions of a furnace for the manufacture of HF.

Now, as set out above, the use of solid pulverulent calcium fluoride as starting material for the industrial manufacture of HF requires that it is essential to satisfy the criteria of size of the particles. The use of $CaF_2$ in the form of fine particles (of the order of a micrometre) is thus ruled out, due to problems of these particles being carried away in the gaseous HF produced in the furnace and a rise in viscosity of the mixture in the reaction region of such a nature as to cause it to adhere to the internal walls of the furnace, these various problems jeopardizing the smooth running of a continuous operation.

These difficulties, related to the use in an HF furnace of finely divided fluorospar, are well recognized, on the other hand, by Japanese Patent JP 52-10893. This document recommends, in order to solve this problem, carrying out a granulation by mixing the said powder in a granulator-mixer with, as additional agent, dilute hydrofluoric acid, dilute sulphuric acid and a concentrated solution of gypsum or a solution in which it is present. A drying stage at a temperature of between 100 and 450° C. is also required. However, this process requires an additional shaping operation and industrial equipment suited to its implementation.

DESCRIPTION OF THE INVENTION

One aim of the present invention is to avoid the discharging, which is always harmful to the environment, of a composition comprising calcium fluoride in the form of micrometric particles.

Another aim of the invention is to provide a process for recycling such a composition which allows it to be recovered in value, without requiring the installation of new industrial equipment.

Another aim of the invention is to provide a process for recycling such a composition which makes possible the industrial manufacture of HF under improved conditions.

It has now been found that these aims can be achieved, in whole or in part, by means of the recycling process which is disclosed below.

The subject-matter of the invention is therefore, firstly, a process for recycling a composition comprising pulverulent calcium fluoride in the form of micrometric particles comprising:

(i) a stage of mixing, in the presence of water, the said composition with pulverulent calcium fluoride (also known as natural spar), the particle size of which is suitable for feeding an HF furnace, in a ratio r of less than 75% by weight, preferably of less than 30%, r being the weight of calcium fluoride of the said composition divided by the total weight of $CaF_2$ in the mixture, then (ii) a stage of drying the mixture resulting from (i) until a residual water content is obtained which is also suitable for feeding an HF furnace;

the stage (ii) optionally being carried out simultaneously with the stage (i).

This process makes it possible to re-use, under satisfactory conditions of continuous operation of a rotary furnace for the manufacture of HF according to the reaction (1), a synthetic spar composition (as defined below) which should otherwise be stored as a waste. Furthermore, it has been found that the calcium fluoride as obtained by this process contributes various advantages as relates to the production of HF, as explained later.

The percentages indicated in the present text are, in the absence of a contrary indication, percentages by weight.

The composition to be recycled generally comprises calcium fluoride in the form of particles with a mean nominal diameter of between 0.5 and 10 μm, preferably between 1 and 5 μm.

The mean nominal diameter is the median of the distribution of the sizes of the calcium fluoride particles.

The sizes are determined, depending on their order of magnitude, either by a technique involving a measurement of rate of sedimentation or by a laser diffraction technique or by sieving with sieves of increasing mesh size.

In addition to $CaF_2$, the composition to be recycled comprises water at a content of between 20 and 60%, preferably between 30 and 55%. Such a composition is also denoted in the present text by the appellation "synthetic spar". It can be obtained from liquid effluents comprising fluoride ions originating from a site for the manufacture of HF or of fluorinated compounds which can be used in particular as refrigerants. For this, it is sufficient to carry out a filtration (for example by means of a drum filter) of the suspension resulting from the neutralization by lime of the said effluents, without it being necessary to carry out an additional drying stage. Besides, such a stage would be difficult to carry out because of the fine size of the particles.

It is preferable to employ a composition to be recycled (or synthetic spar) with a silica ($SiO_2$) content of less than 1%, preferably of less than 0.8%. This is because the yield of HF produced is improved in this case.

The mean nominal diameter of the natural spar particles is generally between 30 and 400 μm, preferably between 40 and 200 μm.

The natural spar can be prepared from natural spar ore (or fluorospar) by a process comprising several crushing or milling and purification stages generally carried out by flotation.

The final stages of such a process necessarily include a stage of filtration of a natural spar suspension with a solids content of between 5 and 75%, preferably between 20 and 50%. On conclusion of this filtration stage, the water content in the natural spar is generally between 1 and 20%, preferably between 1 and 15%, the corresponding composition being denoted by the term "wet cake". This filtration stage is necessarily carried out on the site of production of the ore and is carried out by any means suitable for this purpose, such as a drum filter.

This stage is necessarily followed by a stage of drying the wet cake, so as to obtain a natural spar with a residual water content suitable for feeding a furnace for the manufacture of HF.

This content is advantageously less than 1%, preferably less than 0.1%. Such a water content is essential in order to satisfy the necessary restrictions for use in an HF furnace, where an excessive amount of water could result in corrosion of the material constituting the furnace harmful to the operational safety of the industrial unit. This drying stage can be carried out either on the site of production of the ore or on the site of the industrial unit for the manufacture of HF. It is carried out by any means suitable for this purpose, such as a rotary furnace operating at a temperature between 100 and 500° C., preferably between 100 and 200° C.

According to a preferred first alternative form of the process according to the invention, the stage (i) is carried out by homogeneously mixing in the desired ratio r:

the composition to be recycled, optionally diluted beforehand with water, with the natural spar suspension intended for the filtration stage of the process for the preparation of the said spar.

This mixing can be carried out in a tank provided with a stirring device and with introduction of the amount of water necessary to facilitate the mixing.

In the case of this first alternative form, the mixture obtained in the stage (i) is then advantageously, and in accordance with the stage (ii) of the process according to the invention, dried in 2 stages consisting:

(ii1) of a filtration operation, so as to obtain a solid pulverulent composition of calcium fluoride particles with a water content of between 1 and 20%, preferably between 1 and 15%, then (ii2) of a drying operation, so as to obtain a calcium fluoride with a residual water content of less than 1%, preferably of less than 0.1%.

According to a particularly advantageous mode of the preferred first alternative form of the process according to the invention, these two stages are carried out respectively in the filtration device used in the process for the preparation of the natural spar, such as, for example, in a drum filter, and in the drying device also used in the process for the preparation of the natural spar, such as a rotary furnace. This mode makes it possible to carry out the recycling of the synthetic spar by using existing industrial equipment on the site for production of fluorospar, without requiring the installation of expensive industrial equipment.

According to a preferred second alternative form of the process according to the invention, the process is carried out by homogeneously mixing in the desired ratio r:

the composition to be recycled with the wet natural spar cake originating from the filtration stage of the process for the preparation of the said spar;

and by simultaneously drying the said mixture.

This operation is carried out, for example, by means of a disc drier. It can advantageously be carried out on the site for production of the HF by using the device used to dry the wet natural spar cake, without requiring the installation of additional industrial equipment.

A disc drier is a horizontal stationary cylinder provided with an axis of rotation to which are attached hollow discs equipped on their periphery with stops. The interior of these discs is connected to a line for feeding steam brought, for example, to a pressure of 10 bar.

The 2 compositions are introduced at one end of the cylinder and they are subsequently forced by the rotational movement of the discs towards the other end of the cylinder. During this movement from one end of the cylinder to the other, the two compositions are simultaneously mixed and dried. The residence time of the product in the disc drier is set by the rotational speed of the shaft and the orientation of the stops and can be determined without difficulty by a person skilled in the art by means of repeated tests.

Another subject-matter of the invention is a process for the manufacture of HF by reaction of pulverulent calcium fluoride with sulphuric acid in a rotary furnace brought to a temperature of between 400 and 700° C., preferably between 500 and 600° C., characterized in that the pulverulent calcium fluoride is obtained by the recycling process as defined above.

This process makes possible the production of HF under satisfactory conditions of continuous operation of a rotary furnace. Furthermore, production in this way surprisingly offers at least one of the following advantages:

production of calcium sulphate with an improved purity, improvement in the productivity of HF, decrease in the risk of corrosion of the furnace, decrease in the consumption of reactants per tonne of HF produced.

A final subject-matter of the invention is a pulverulent calcium fluoride, characterized in that it comprises the mixture of the composition to be recycled and of natural spar, in the ratio r of less than 75%, preferably of less than 30%, as employed in the recycling process according to the invention.

The invention is illustrated by the following examples which should under no circumstances be interpreted in a limiting way.

EXAMPLE 1

Recycling of a Synthetic Spar Composition in Natural Spar in a Ratio r Equal to 11% with Drying in a Rotary Furnace Use is made of 2 tonnes of a synthetic spar composition containing 50% of calcium fluoride, in the form of particles with a mean nominal diameter of 2 $\mu$m, and 50% of water.

Recycling is carried out in the unit for the preparation of the natural spar.

This composition is diluted with water, so as to obtain 3.1 t of suspension having a solids content of 32%.

This suspension is then introduced into a holding tank equipped with a rotary paddle stirrer, into which tank are also introduced 20.8 t of a suspension of natural spar with a mean nominal diameter of between 50 and 60 $\mu$m having a solids content of 39%.

The ratio r of the weight of micrometric calcium fluoride particles to the total weight of the said calcium fluoride is 11%.

24 t of a calcium fluoride suspension with a solids content of 38% are obtained.

This suspension is then introduced for filtration into 2 drum filters arranged in parallel, each having a capacity at least equal to 12 t/hour of suspension.

A wet calcium fluoride cake is obtained at the outlet having a water content of 14%.

This cake is introduced, via a hopper, at the rate of 5 t/h into a rotary furnace having a water evaporating capacity of 1000 kg/hour.

A pulverulent calcium fluoride is obtained having a water content of less than 0.1%.

EXAMPLE 2

Recycling of a Synthetic Spar Composition in Natural Spar in a Ratio r Equal to 25% with Mixing and Drying in a Disc Drier Use is made of 50 kg of a synthetic spar composition containing 50% of calcium fluoride, in the form of particles with a mean nominal diameter of 2 $\mu$m, and 50% of water.

Use is made of 81.5 kg of a composition comprising natural spar and 8% of water.

These 2 compositions are introduced into a disc drier.

The ratio r of the weight of micrometric calcium fluoride particles to the total weight of the said calcium fluoride is 25%.

Use is made of a disc drier having a water evaporating capacity at least equal to 15 kg/hour.

The synthetic spar composition is introduced at the rate of 25 kg/hour and the abovementioned natural spar composition is introduced at the rate of 41 kg/hour.

The residence time is set at approximately 2 hours.

A pulverulent calcium fluoride is obtained having a water content of less than 0.1%.

EXAMPLE 3

Recycling of a Synthetic Spar Composition in Natural Spar in a Ratio r Equal to 60% with Drying in a Disc Drier Example 2 is repeated, the following being introduced into the disc drier:

55 kg of the synthetic spar composition at the rate of a throughput of 27.5 kg/hour, 20 kg of the composition comprising natural spar at the rate of a throughput of 10 kg/hour.

A pulverulent calcium fluoride is obtained having a moisture content of between 0.1 and 0.2%.

COMPARATIVE EXAMPLE 1

Use of Natural Spar in a Furnace for the Manufacture of HF

A Furnace for the manufacture of HF is fed with natural spar and sulphuric acid.

The $CaF_2$ throughput is 1576 kg/h.

The $H_2SO_4$ throughput is 2108 kg/hour.

The combustion chamber temperature of the furnace is 575° C.

HF is produced continuously with a throughput of 698 kg/h under satisfactory operating conditions of the furnace.

Analysis of the contents of $CaF_2$ and $H_2SO_4$ in the calcium sulphate gives the following results respectively: 2.4% and 2.2%.

EXAMPLE 4

Use in a Furnace for the Manufacture of HF, Heated to 575° C., of a Synthetic Spar/Natural Spar Mixture in the Ratio r Equal to 11%

The preceding comparative example is repeated, except that the furnace is fed with calcium fluoride prepared in accordance with Example 1.

HF is produced continuously with a throughput of 710 kg/h under satisfactory conditions of operation of the furnace.

Analysis of the $CaF_2$ and $H_2SO_4$ contents gives the following results respectively: 1.4% and 1.7%.

EXAMPLE 5

Use in a Furnace for the Manufacture of HF of a Synthetic Spar/Natural Spar Mixture in the Ratio r Equal to 25%

Example 4 is repeated, calcium fluoride prepared in accordance with Example 2 being used.

HF is produced continuously with a throughput of 716 kg/h under satisfactory conditions of operation of the furnace.

Analysis of the $CaF_2$ and $H_2SO_4$ contents gives the following results respectively: 0.9% and 1.1%.

EXAMPLE 6

Use in a Furnace for the Manufacture of HF of a Synthetic Spar/Natural Spar Mixture in the Ratio r Equal to 60%

Example 4 is repeated, calcium fluoride prepared in accordance with Example 3 being used.

HF is produced continuously with a throughput of 722 kg/h under satisfactory conditions of operation of the furnace.

Analysis of the $CaF_2$ and $H_2SO_4$ contents gives the following results respectively: 0.4% and 0.7%.

Examples 4 to 6 reveal, with respect to Comparative Example 1, an improvement in the productivity of HF and a reduction in the content of impurities in the calcium sulphate.

EXAMPLE 7

Use in a Furnace for the Manufacture of HF, Heated to 560° C., of a Synthetic Spar/Natural Spar Mixture in the Ratio r Equal to 11%

Example 4 is repeated, a combustion chamber temperature of the furnace equal to 560° C. being set.

HF is produced continuously with a throughput of 706 kg/h under satisfactory conditions of operation of the furnace.

Analysis of the $CaF_2$ and $H_2SO_4$ contents gives the following results respectively: 1.7% and 1.9%.

This example shows, with respect to Comparative Example 1, an improvement in the productivity of HF which is obtained, moreover, with a fall in the combustion chamber temperature of the furnace which is advantageous in terms of fall in the energy consumption and of prevention of the risk of corrosion and therefore of decrease in the maintenance cost.

EXAMPLE 8

Use in a Furnace for the Manufacture of HF, Heated to 575° C., of a Synthetic Spar/Natural Spar Mixture in the Ratio r Equal to 11% Introduced at the Rate of 1718 kg/h Example 4 is repeated, the furnace being fed with a $CaF_2$ throughput equal to 1718 kg/h and an $H_2SO_4$ throughput of 2300 kg/h.

HF is produced continuously with a throughput of 761 kg/h under satisfactory conditions of operation of the furnace.

Analysis of the $CaF_2$ and $H_2SO_4$ contents gives the following results respectively: 2.1% and 2.2%.

EXAMPLE 9

Use in a Furnace for the Manufacture of HF, Heated to 575° C., of a Synthetic Spar/Natural Spar Mixture in the Ratio r Equal to 25% Introduced at the Rate of 1812 kg/h Example 4 is repeated, the furnace being fed with a $CaF_2$ throughput equal to 1812 kg/h and an $H_2SO_4$ throughput of 2430 kg/h.

HF is produced continuously with a throughput of 803 kg/h under satisfactory conditions of operation of the furnace.

Analysis of the $CaF_2$ and $H_2SO_4$ contents gives the following results respectively: 1.9% and 2.2%.

Examples 8 and 9 show, with respect to Comparative Example 1, that it is possible, by virtue of the process according to the invention, to increase the amount of HF produced by the furnace without increasing the spar consumption, expressed per tonne of HF.

COMPARATIVE EXAMPLE 2

Use in a Furnace for the Manufacture of HF, Heated to 575° C., of Synthetic Spar A furnace for the manufacture of HF is fed with calcium fluoride with a mean nominal diameter of 2 $\mu$m.

The $CaF_2$ throughput is 1576 kg/h.

The $H_2SO_4$ throughput is 2108 kg/hour.

The combustion chamber temperature of the furnace is 575° C.

After operating for 2 hours, a rise in pressure and an accumulation of $CaSO_4$ in the furnace are observed, the accumulation of $CaSO_4$ being identifiable by the increased electrical consumption of the motor providing the rotation.

These problems do not make it possible for continuous production of HF to be provided under these conditions.

What is claimed is:

1. Process for recycling a composition comprising pulverulent calcium fluoride in the form of micrometric particles comprising:
   (i) a stage of mixing, in the presence of water, the said composition with pulverulent calcium fluoride, also known as natural spar, the particle size of which is suitable for feeding an HF furnace, in a ratio r of less than 75% by weight, then
   (ii) a stage of drying the mixture resulting from (i) until a residual water content is obtained which is also suitable for feeding an HF furnace;
the stage (ii) optionally being carried out simultaneously with the stage (i).

2. Process according to claim 1, wherein the composition to be recycled comprises calcium fluoride in the form of particles with a mean nominal diameter of between 0.5 and 10 $\mu$m.

3. Process according to claim 2, wherein the mean nominal diameter is between 1 and 5 $\mu$m.

4. Process according to claim 1, wherein, in addition to the $CaF_2$, the composition to be recycled comprises water at a content of between 20 and 60%.

5. Process according to claim 4, wherein the water content is between 30 and 50%.

6. Process according to claim 1, wherein the composition to be recycled has a silica ($SiO_2$) content of less than 1%.

7. Process according to claim 6, wherein the silica content is less than 0.8%.

8. Process according to claim 1, wherein the mean nominal diameter of the natural spar particles is between 30 and 400 $\mu$m.

9. Process according to claim 8, wherein the mean nominal diameter is between 40 and 200 $\mu$m.

10. Process according to claim 1, wherein the residual water content in the mixture resulting from the stage (ii) is less than 1%.

11. Process according to claim 10, wherein the residual water content is less than 0.1%.

12. Process according to claim 1, wherein the stage (i) is carried out by homogeneously mixing in the desired ratio r:
- the composition to be recycled, optionally diluted beforehand with water, with
- the natural spar suspension intended for the filtration stage of the process for the preparation of the said spar.

13. Process according to claim 12, wherein the mixture obtained in the stage (i) is dried in 2 stages consisting:
- (ii1) of a filtration operation, so as to obtain a solid pulverulent composition of calcium fluoride particles with a water content of between 1 and 20%, then
- (ii2) of a drying operation, so as to obtain a calcium fluoride with a residual water content of less than 1%.

14. Process according to claim 13, wherein the stages (ii1) and (ii2) are carried out respectively in the filtration device and in the drying device used in the process for the preparation of the natural spar.

15. Process according to claim 13, wherein the water content is between 1 and 15% and the residual water content is less than 0.1%.

16. Process according to claim 1, wherein homogeneous mixing is carried out in the desired ratio of r of:
- the composition to be recycled with
- the wet natural spar cake originating from the filtration stage of the process for the preparation of the said spar;

and the said mixture is simultaneously dried.

17. Process for the manufacture of HF by reaction of pulverulent calcium fluoride with sulphuric acid in a rotary furnace brought to a temperature of between 400 and 700° C., wherein the pulverulent calcium fluoride is obtained by the recycling process as defined in claim 1.

18. Pulverulent calcium fluoride, wherein it comprises a mixture of the composition to be recycled and of natural spar, in a ratio r of less than 75%, the said mixture being as defined in claim 1.

19. Process according to claim 1, wherein r is less than 30%.

* * * * *